United States Patent
Lemieux (10) Patent No.: US 9,346,508 B1
(45) Date of Patent: May 24, 2016

(54) SIDE PANEL FOR A SNOWMOBILE

(71) Applicant: BOMBARDIER RECREATIONAL PRODUCTS INC., Valcourt (CA)

(72) Inventor: Rene Lemieux, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/631,722

(22) Filed: Feb. 25, 2015

Related U.S. Application Data (60) Provisional application No. 61/944,230, filed on Feb. 25, 2014.

(51) Int. Cl.
| | |
|---|---|
| *B62J 25/00* | (2006.01) |
| *G05G 1/58* | (2008.04) |
| *B60N 3/06* | (2006.01) |
| *B62M 27/02* | (2006.01) |

(52) U.S. Cl.
CPC . *B62J 25/00* (2013.01); *B60N 3/06* (2013.01); *G05G 1/58* (2013.01); *B60Y 2200/252* (2013.01); *B62M 2027/028* (2013.01)

(58) Field of Classification Search
CPC ............. B62J 25/00; B60N 3/06; G05G 1/58; G05G 1/60; B62M 2027/028; B60Y 2200/252
See application file for complete search history.

(56) References Cited

U.S. PATENT DOCUMENTS

| | | | |
|---|---|---|---|
| 6,923,284 B2* | 8/2005 | Bedard | B62M 27/02 180/190 |
| 2003/0127265 A1* | 7/2003 | Watson | B62J 35/00 180/190 |
| 2005/0034909 A1* | 2/2005 | Vaisanen | B62J 25/00 180/190 |
| 2007/0034435 A1* | 2/2007 | Berg | B62J 1/12 180/190 |

* cited by examiner

*Primary Examiner* — Drew Brown
(74) *Attorney, Agent, or Firm* — BCF LLP (57) ABSTRACT

A side panel for a vehicle having a straddle seat. The side panel has an outer surface and is configured to be connected on a side of the vehicle at least in part longitudinally forward of the straddle seat and vertically lower than the straddle seat. The outer surface defines a first leg area configured to accommodate at least a portion of a leg of a driver seated on the straddle seat in a first position, and a second leg area configured to accommodate at least a portion of the leg of the driver seated on the straddle seat in a second position. The second leg area is disposed at least in part longitudinally forward of the first leg area when the side panel is connected on the vehicle. A vehicle having a left and right side panel is also disclosed.

11 Claims, 10 Drawing Sheets

SIDE PANEL FOR A SNOWMOBILE

CROSS-REFERENCE

The present application claims priority to U.S. Provisional Patent Application No. 61/944,230 filed on Feb. 25, 2014, the entirety of which is incorporated herein by reference.

TECHNICAL FIELD

The present technology relates to side panels for snowmobiles.

BACKGROUND

When driving a straddle-seat vehicle such as a snowmobile, the driver is typically positioned upright on the seat when the vehicle is moving in a straight-ahead direction. When turning however, the driver may lean towards the inside of the turn in addition to turning the handlebar to that side. Typically, the driver leans further for executing sharper and/or faster turns than when gently turning the vehicle. It is therefore desirable, especially in high-performance and sport vehicles, to configure the vehicle such that the driver is positioned comfortably and firmly thereon both while driving in a straight-ahead orientation and when executing turns.

SUMMARY

One object of the present is to ameliorate at least some of the inconveniences of the prior art.

In accordance with one aspect of the present technology, there is provided a side panel for a vehicle having a straddle seat. The side panel has an outer surface and is configured to be connected on a side of the vehicle at least in part longitudinally forward of the straddle seat and vertically lower than the straddle seat. The outer surface defines a first leg area configured to accommodate at least a portion of a leg of a driver seated on the straddle seat in a first position, and a second leg area configured to accommodate at least a portion of the leg of the driver seated on the straddle seat in a second position. The second leg area is disposed at least in part longitudinally forward of the first leg area when the side panel is connected on the vehicle. A vehicle having a left and right side panel is also disclosed.

In some implementations, the second leg area is disposed at least in part laterally outwardly of the first leg area when the side panel is connected on the vehicle.

In some implementations, the outer surface includes a first laterally extending surface and a second laterally extending surface disposed at least in part longitudinally forward of the first laterally extending surface when the side panel is connected on the vehicle. Each of the first and second laterally extending surfaces extend generally laterally and vertically when the side panel is connected on the vehicle. The first leg area is defined at least in part by the first laterally extending surface, and the second leg area is defined at least in part by the second laterally extending surface.

In some implementations, the second laterally extending surface extends laterally outwardly of the first laterally extending surface.

In some implementations, the outer surface includes a longitudinally extending surface extending generally longitudinally and vertically when the side panel is connected on the vehicle, the longitudinally extending surface being disposed at least in part longitudinally rearward of the second laterally extending surface and longitudinally forward of the first laterally extending surface when the side panel is connected on the vehicle.

In some implementations, a longitudinal direction width of the longitudinally extending surface increases continuously from its lower end to its upper end.

In some implementations, the outer surface extends continuously from the first laterally extending surface to the longitudinally extending surface.

In some implementations, the outer surface further includes a longitudinally extending surface extending generally longitudinally and vertically when the side panel is connected on the vehicle, the laterally extending surface being disposed at least in part longitudinally rearward of the first laterally extending surface when the side panel is connected on the vehicle. In another aspect, the longitudinally extending surface is a first longitudinally extending surface and further comprising a second longitudinally extending surface extending generally longitudinally and vertically when the side panel is connected on the vehicle, the second longitudinally extending surface being disposed at least in part longitudinally rearward of the second laterally extending surface and longitudinally forward of the first laterally extending surface when the side panel is connected on the vehicle.

In accordance with another aspect of the present technology, there is provided a vehicle having a frame, a motor operatively connected to the frame, and a ground engaging member operatively connected to the motor and the frame. The ground engaging member is one of: an endless track, and a wheel. A straddle seat is connected to the frame and configured to accommodate at least a driver of the vehicle. A left side panel is connected on a left side of the frame and a right side panel is connected on a right side of the frame. Each of the left and right side panels is disposed at least in part longitudinally forward of and vertically lower than the straddle seat. The left side panel defines a rear left leg area and a front left leg area disposed longitudinally forward of the rear left leg area, the rear left leg area selectively accommodates a portion of a left leg of the driver in a first left leg position and the front left leg area selectively accommodating a portion of the left leg of the driver in a second left leg position. A right side panel defines a rear right leg area and a front right leg area disposed longitudinally forward of the rear right leg area. The rear right leg area selectively accommodates a portion of a right leg of the driver in a first right leg position and the front right leg area selectively accommodates a portion of the right leg of the driver in a second right leg position.

For purposes of this application, terms related to spatial orientation such as forwardly, rearwardly, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, such as the ice scratcher for example, should be understood as they would be understood when these components or sub-assemblies are mounted to the vehicle.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Although the present technology is described below with respect to a snowmobile, it is contemplated that aspects could be applied to other straddle-seat vehicles, such as motorcycles and the like.

Figure 1:
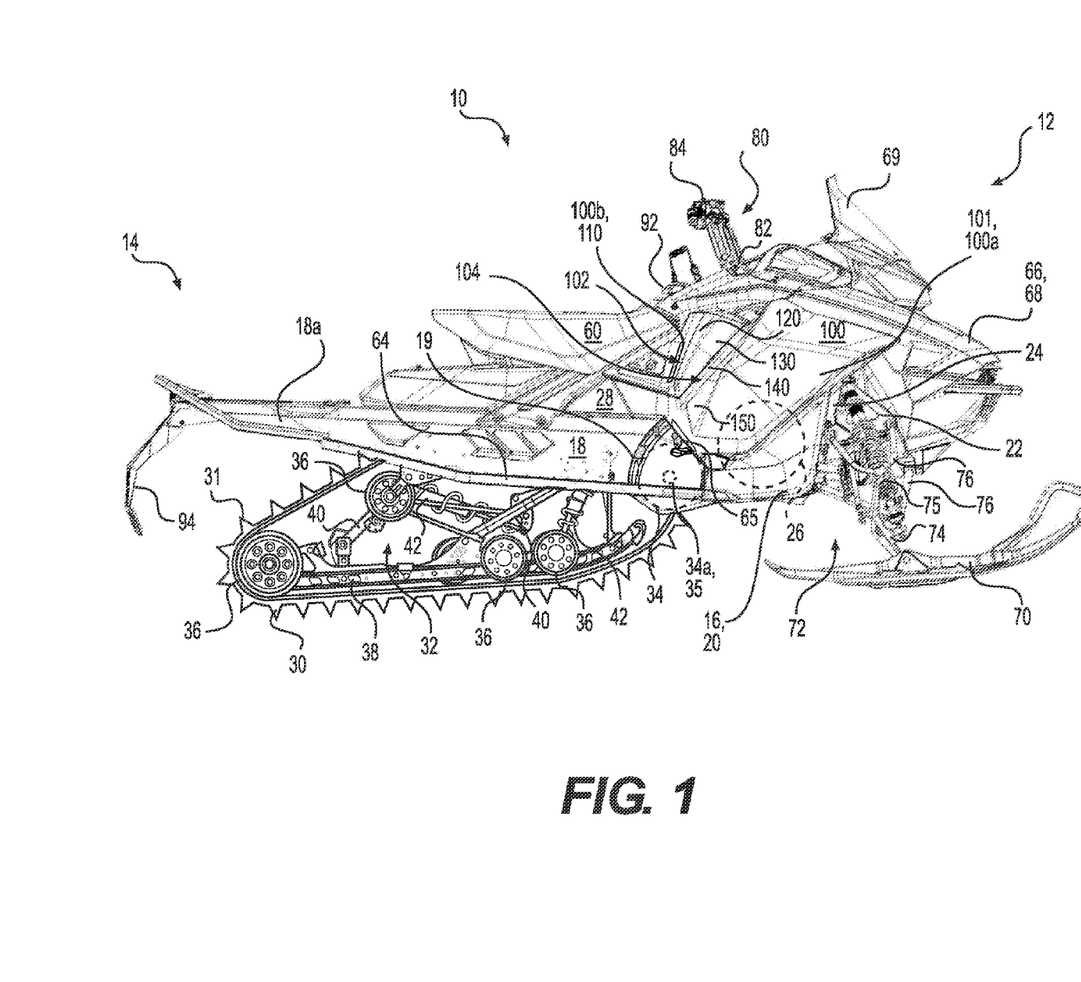
FIG. 1 is a right side elevation view of a snowmobile.

With reference to FIG. 1, a snowmobile 10 includes a front end 12 and a rear end 14 which are defined consistently with a travel direction of the vehicle 10. The snowmobile 10 includes a vehicle body in the form of a frame or chassis 16 which includes a rear tunnel 18, an engine support structure 20, a front suspension module 22 and an upper structure 24. The tunnel 18 is formed from sheet metal parts assembled to form an inverted U-shape when viewed from the forward or rearward end 12, 14. The inverted U-shaped tunnel 18 has a left side portion 18a and a right side portion 18a (only the right side portion 18a being seen in the figures). Each side portion 18a is bent laterally outwardly at its bottom edge to form a corresponding footrest 64. A vertically extending longitudinal plane 13 (FIG. 2B) passing through a lateral center of the snowmobile 10 is referred to herein as the longitudinal centerplane 13 of the snowmobile 10.

A motor 26 (schematically illustrated in FIG. 1) is carried in an engine compartment defined by the engine support structure 20 of the frame 16. In the illustrated implementation, the motor 26 is an internal combustion engine, but it is contemplated that it could be other than an internal combustion engine, for example, and electric motor or a hybrid. A fuel tank 28, supported above the tunnel 18, supplies fuel to the engine 26 for its operation.

An endless drive track 30 is positioned generally under the tunnel 18, and operatively connected to the engine 26 through a belt transmission system (not shown) and a reduction drive. The endless drive track 30 is driven to run about a rear suspension assembly 32 connected to the frame 16 for propulsion of the snowmobile 10. The endless drive track 30 has a plurality of lugs 31 extending from an outer surface thereof to provide traction to the track 30.

The rear suspension assembly 32 includes a drive sprocket 34 (shown schematically), one or more idler wheels 36 and a pair of slide rails 38 in sliding contact with the endless drive track 30. The drive sprocket 34 is mounted on a drive axle 35 (shown schematically) and defines a sprocket axis 34a. The slide rails 38 are attached to the tunnel 18 by front and rear suspension arms 40 and one or more shock absorbers 42 which include a coil spring (not indicated) surrounding the individual shock absorbers 42. It is contemplated that the snowmobile 10 could be provided with a different implementation of a rear suspension assembly 32 than the one shown herein.

A straddle-type seat 60 is positioned atop the fuel tank 28. A fuel tank filler opening covered by a cap 92 is disposed on the upper surface of the fuel tank 28 in front of the seat 60. It is contemplated that the fuel tank filler opening 92 could be disposed elsewhere on the fuel tank 28. The seat 60 is adapted to accommodate a driver of the snowmobile 10. The seat 60 can also be configured to accommodate a passenger. A footrest 64 is positioned on each side of the snowmobile 10 below the seat 60 to accommodate the driver's feet (only the right footrest 64 is shown in the figures). Each of the left and right footrests 64 extends generally laterally outwardly from the corresponding left and right side portion of the tunnel 18. A footstop 63 (best seen in FIG. 2C) is disposed forward of each footrest 64. In the illustrated implementation, as can be seen best in FIG. 2C, each footstop 63 extends generally vertically. A toehold 65 is disposed above the front portion of each footrest 64. Each toehold 65 is disposed longitudinally rearwardly of the corresponding footstop 63 and extends above the upper end thereof. Each toehold 65 extends rearwardly and upwardly. Each toehold 65 is disposed laterally outwardly of the tunnel 18 and mounted thereto. It is contemplated that the toehold 65 could be configured differently than as shown herein. It is contemplated that the toehold 65 could be formed integrally with the footstop 63. It is also contemplated that the toehold 65 could be omitted.

At the front end 12 of the snowmobile 10, fairings 66 enclose the engine 26, the belt transmission system and other components of the powerpack such as the air intake system. The fairings 66 include a hood 68 which can be opened to allow access to the engine 26 and other internal components of the snowmobile 10 from the top and the front which may be required, for example, for inspection or maintenance of the engine 26 and/or powerpack. The fairings 66 also include a left side panel (not shown) extending on a left side of the snowmobile 10 and a right side panel 100 extending on a right side of the snowmobile 10. The engine 26 and the transmission system are disposed between the left and right side panels 100. The left and right side panels 100 are both removably connected to the frame 16 and/or to other fairing panels 66 and can be removed to access the internal components from the corresponding lateral side. In the illustrated implementation, the panels 100 are hinged for connection to the frame 16 and/or other fairing panels 66. It is contemplated that the panels 100 could be removably connected to the frame 16 and/or other fairing panels 66 by other kinds of removable connections, such as a latch, clip or by press-fitting. The side panels 100 will be described below in further detail. A windshield 69 connected to the fairings 66 acts as a wind screen to lessen the force of the air on the rider while the snowmobile 10 is moving.

Two skis 70 positioned at the forward end 12 of the snowmobile 10 are attached to the front suspension module 22 of the frame 16 through a front suspension assembly 72. The front suspension module 22 is connected to the front end of the engine support structure 24. The front suspension assembly 72 includes ski legs 74, shock absorbers 75, supporting arms 76 and ball joints (not shown) for operatively connecting to the respective ski leg 74, supporting arms 76 and a steering column 82.

A steering assembly 80, including the steering column 82 and a handlebar 84, is provided generally forward of the seat 60. The steering column 82 is rotatably connected to the frame 16. The lower end of the steering column 82 is connected to the ski legs 74 via a steering rod (not shown). The handlebar 84 is attached to the upper end of the steering column 82. The handlebar 84 is positioned in front of the seat 60. The handlebar 84 is used to rotate the steering column 82, and thereby the skis 70, in order to steer the vehicle 10. A throttle operator (not shown) in the form of a thumb-actuated throttle lever is mounted to the right side of the handlebar 84. Other types of throttle operators, such as a finger-actuated throttle lever and a twist grip, are also contemplated. A brake actuator (not indicated), in the form of a hand brake lever, is provided on the left side of the handlebar 84 for braking the snowmobile 10 in a known manner. It is contemplated that the windshield 69 could be connected directly to the handlebar 84.

At the rear end of the snowmobile 10, a snow flap 94 extends downward from the rear end of the tunnel 18. The snow flap 94 protects against dirt that can be projected upward from the drive track 30 when the snowmobile 10 is being driven. It is contemplated that the snow flap 94 could be omitted.

The snowmobile 10 includes other components such as a display cluster, an exhaust system, an air intake system, and the like. As it is believed that these components would be readily recognized by one of ordinary skill in the art, further explanation and description of these components will not be provided herein.

The right side panel 100 will now be described with reference to FIGS. 2A to 4B. In the illustrated implementation, the left side panel (not shown) is a mirror image of the right side panel, and as such will not be described herein.

Figure 2A:
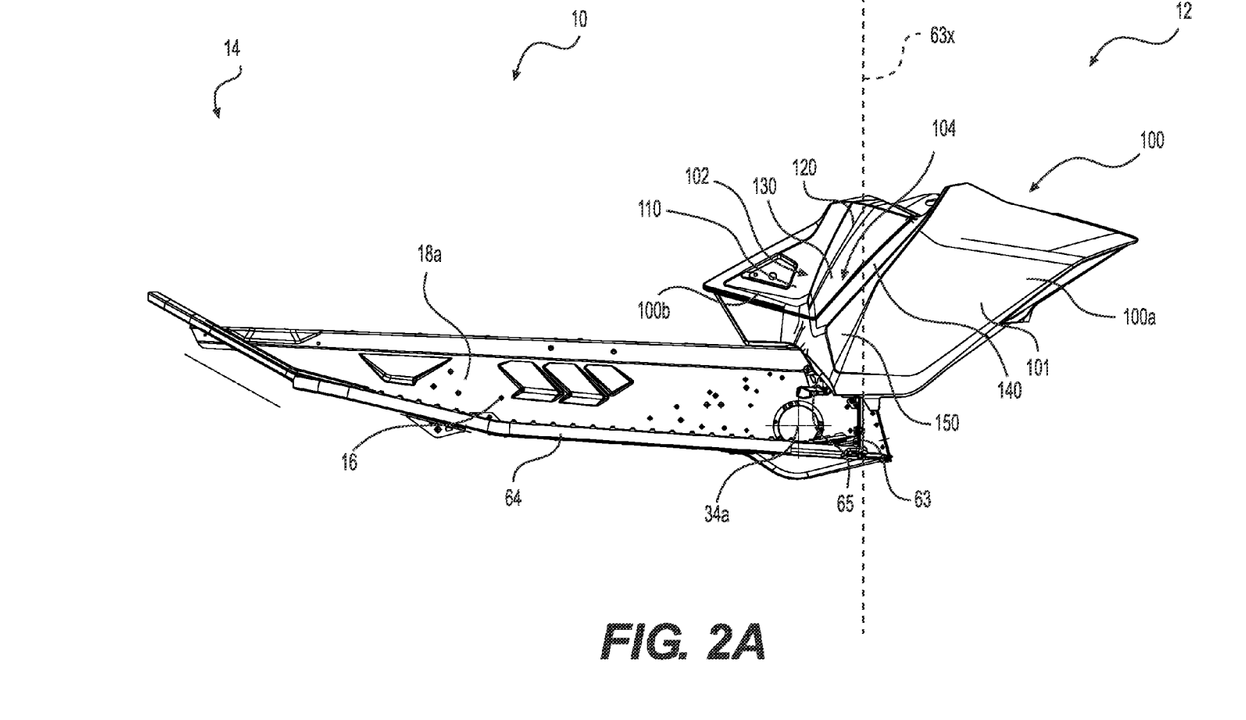
FIG. 2A is a right side elevation view of a right portion of a tunnel and a right side panel of the snowmobile of FIG. 1.
Figure 2B:
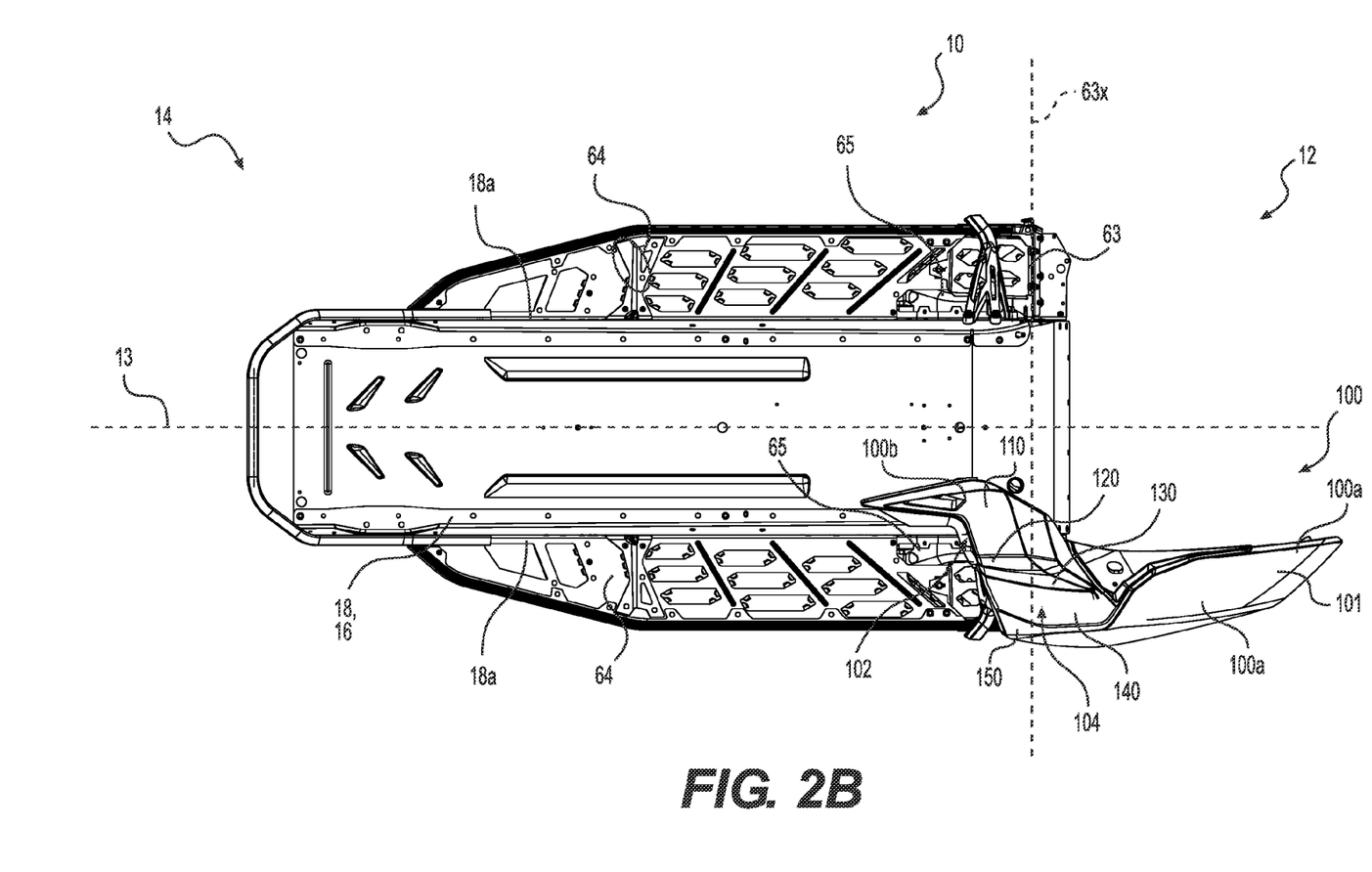
FIG. 2B is a top plan view of the right tunnel portion and the right side panel of FIG. 2A.
Figure 2C:
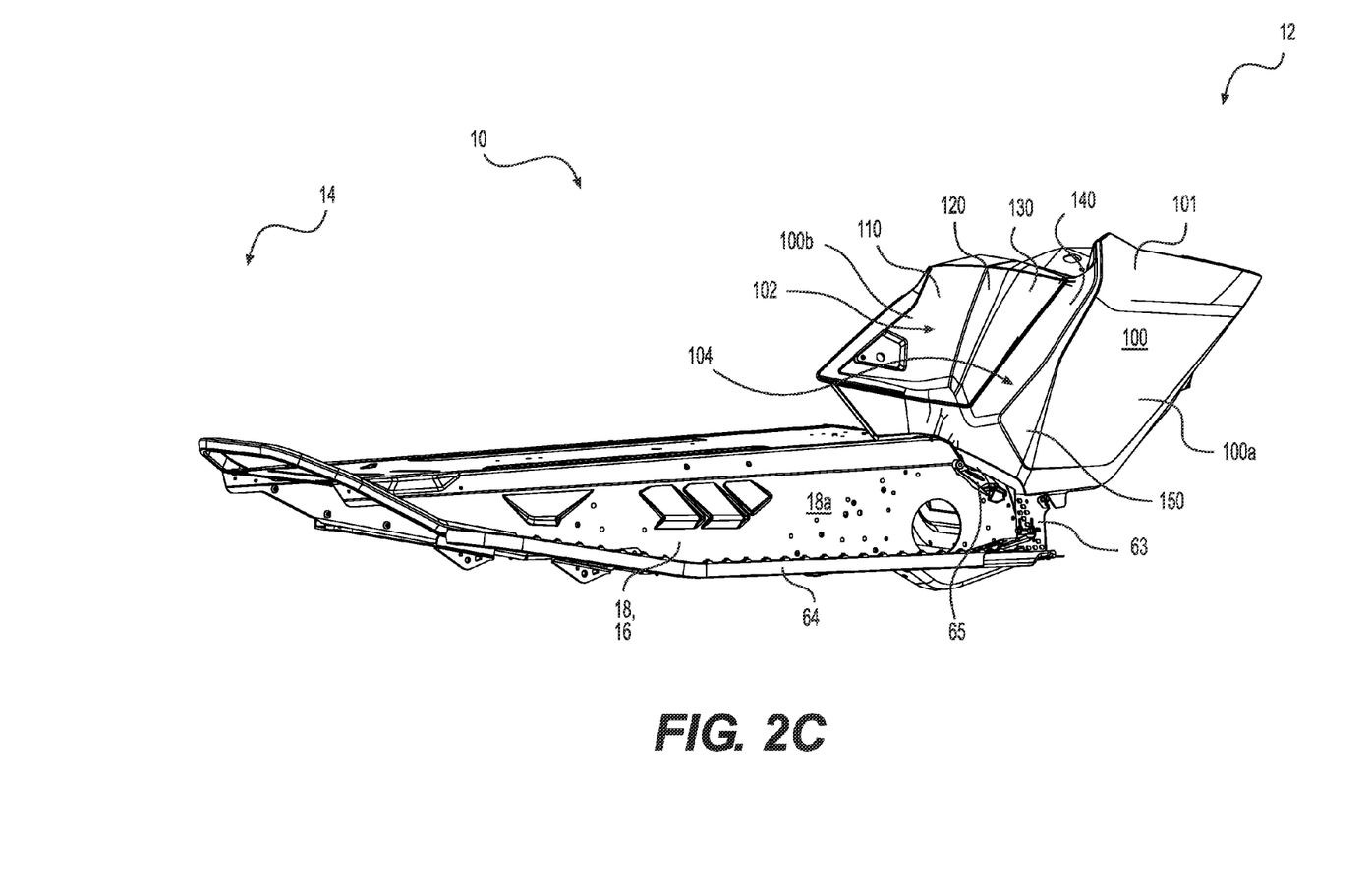
FIG. 2C is a perspective view, taken from a rear, right side, of the right side tunnel portion and the right side panel of FIG. 2A.
Figure 3A:
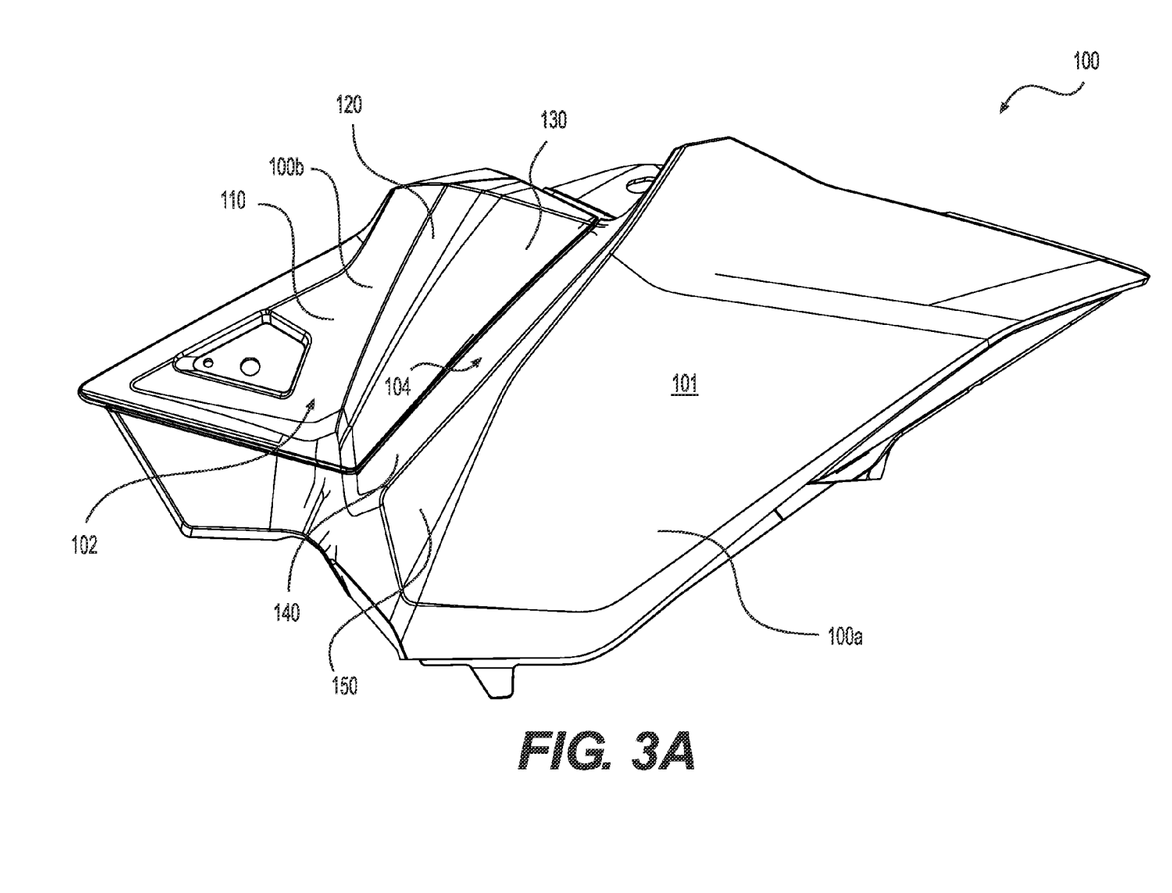
FIG. 3A is a right side elevation view of the right side panel of FIG. 2A shown in isolation.
Figure 3B:
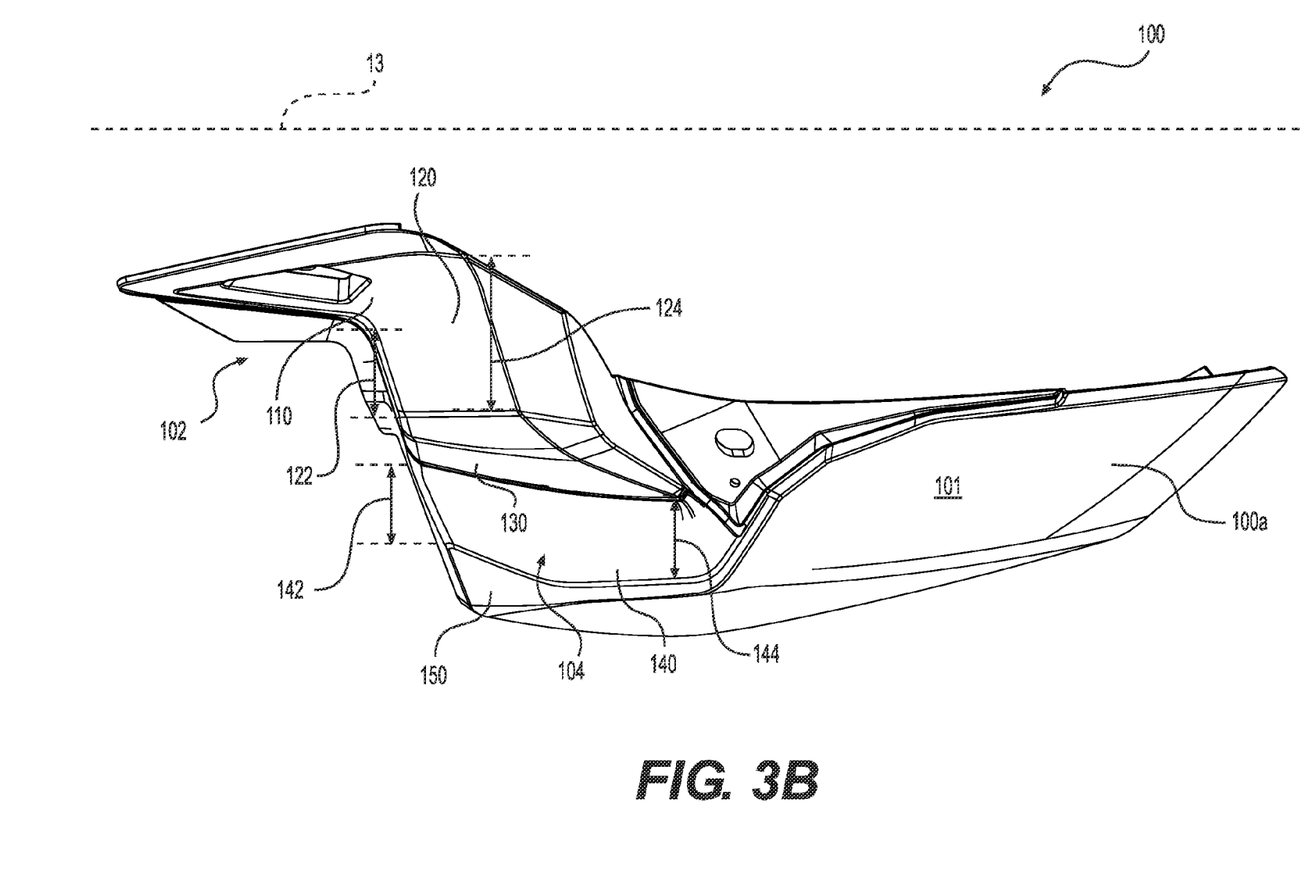
FIG. 3B is a top plan view of the right side panel of FIG. 3A.
Figure 3C:
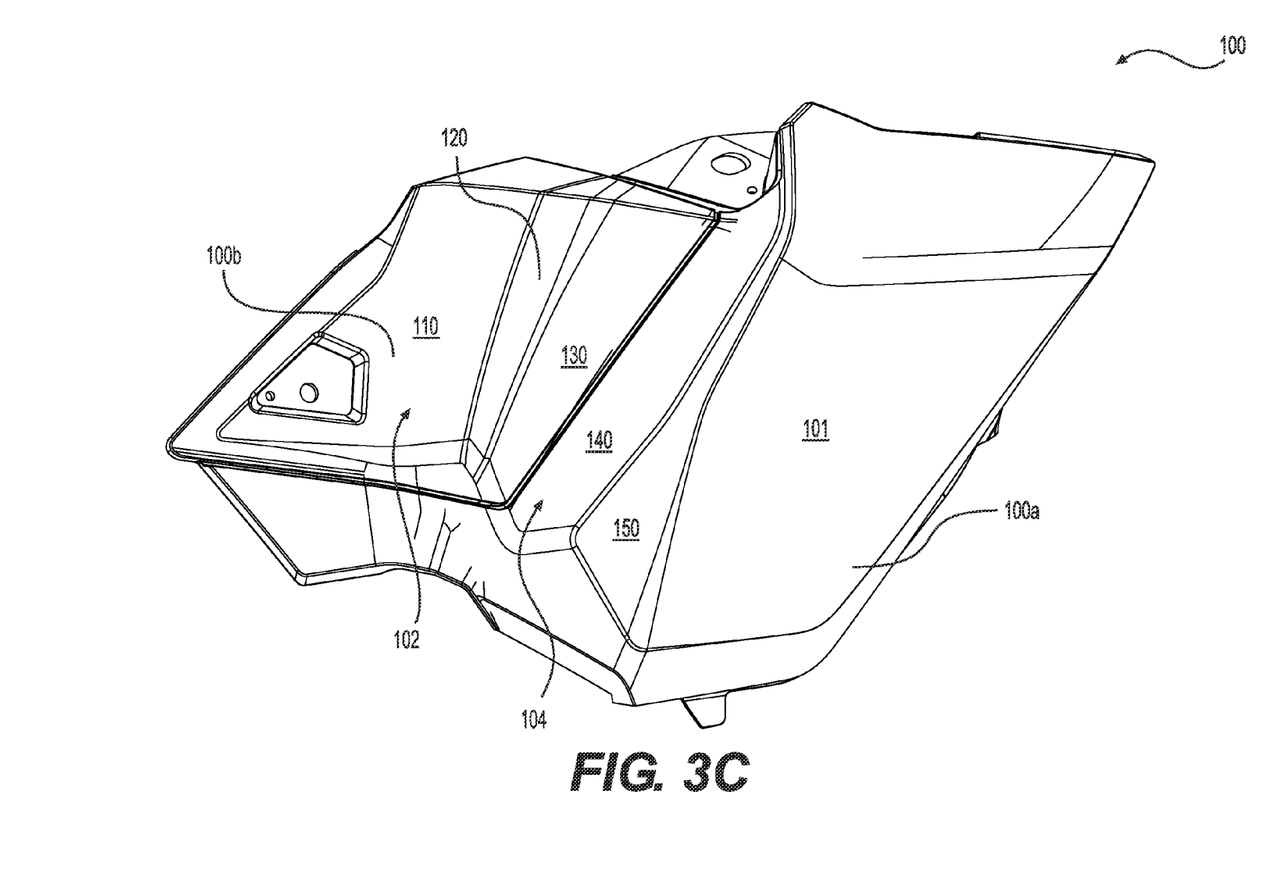
FIG. 3C is a perspective view, taken from a rear, right side, of the right side panel of FIG. 3A.

With reference to FIGS. 2A to 2C, the right side panel 100 is disposed on a right side of the longitudinal centerplane 13 (FIG. 2B). A front portion 100a of the right side panel 100 extends longitudinally forward of the right footrest 64 and the right toehold 65. The front portion 100a extends vertically higher than the upper surface of the tunnel 18 and its lower edge extends down to the bottom surface of the engine support structure 20. A rear portion 100b of the right side panel 100 extends rearwardly from the front portion 100b above the right toehold 65 on a right side of the right tunnel portion 18a. A portion of the rear portion 100b extends above the tunnel 18 and on a right side of the fuel tank 28. A portion of the lower edge of the rear portion 100b is disposed on the upper surface of the tunnel 18. In the illustrated implementation, the right side panel 100 is formed as a single integral panel. It is contemplated that the right side panel 100 could have a plurality of panels connected together.

With reference to FIGS. 2A to 3C, the right side panel 100 has a surface 101 facing laterally outwardly away from the longitudinal centerplane 13, and from the fuel tank 28, the engine 26 and other internal components of the snowmobile 10. The laterally outer surface 101 has a rear longitudinally extending surface portion 110, a rear laterally extending surface portion 120, a front longitudinally extending surface portion 130, a front laterally extending surface portion 140, and a front outer surface portion 150 which will be described below in further detail. For convenience, the above-mentioned surface portions 110, 120, 130, 140, 150 are referred to respectively as the rear longitudinally extending surface 110, the rear laterally extending surface 120, the front longitudinally extending surface 130, the front laterally extending surface 140, and the front outer surface 150.

With reference to FIGS. 2A to 3C, the rear longitudinally extending surface 110 extends generally vertically and longitudinally on a right side of the fuel tank 28. The upper surface of the fuel tank 28 which has the fuel tank filler opening and cap 92 is disposed vertically higher than the upper edge of the rear longitudinally extending surface 110 which slopes downwardly towards the seat 60. The rear laterally extending surface 120 extends laterally outwardly from the front end of the rear longitudinally extending surface 110. The rear laterally extending surface 120 slopes gently forwardly from its lower edge to its upper edge. The lateral direction width 122, 124 (i.e. width measured in the direction normal to the longitudinal centerplane 13) of the rear laterally extending surface 120 increases from its lower end to its upper end as can be seen in FIG. 3B. It is contemplated that the lateral direction width of the rear laterally extending surface 120, or a part thereof, could decrease in an upward direction, or remain constant. The rear laterally extending surface 120 is disposed above the tunnel 18 and the footrest 64 as can be seen in FIG. 2B. As can be seen in FIG. 2A, the rear lateral and longitudinally extending surfaces 120, 110 are disposed longitudinally rearward of the footstop 63. The lower end of the rear laterally extending surface 120 is generally longitudinally aligned with the rear end of the toehold 65 as can be seen in FIGS. 2A and 2B. The rear longitudinally extending surface 110 and the rear laterally extending surface 120 define a rear right leg area 102 discussed below with reference to FIG. 4A.

With reference to FIGS. 2A to 3C, the front longitudinally extending surface 130 extends generally longitudinally and forwardly from the right end of the rear laterally extending surface 120. The front longitudinally extending surface 130 extends smoothly continuously from the rear laterally extending surface 120. The front longitudinally extending surface 130 is aligned in the lateral direction with the footrest 64 as can be seen in FIG. 2B. The front laterally extending surface 140 extends laterally outwardly from the front end of the front longitudinally extending surface 130. The front laterally extending surface 140 is thus disposed laterally outwardly of the rear laterally extending surface 120 as can be seen in FIG. 2B. As can be seen when viewed from a side as in FIGS. 2A and 3A, the front laterally extending surface 140 is also angled forwardly from its lower end toward its upper end, but the front laterally extending surface 140 slopes further away from the vertical than the rear laterally extending surface 120. The lateral direction width (i.e. width measured in the direction normal to the longitudinal centerplane 13) of the front laterally extending surface 140 is generally the same at the upper end 144 and the lower end 142. It is however contemplated that the lateral direction widths 142, 144 could be different than as shown herein. It is also contemplated that the lateral direction width of the front laterally extending surface 140, or a part thereof, could increase in an upward direction, or remain constant. As can be seen in FIG. 2A, the longitudinal direction distance between the front and rear laterally extending surfaces 140, 120 is smaller at their lower ends than at their upper ends. A vertical plane 63*x* passing through the front end of the toehold 65 (and containing the vertical front portion 65*a* of the toehold 65) intersects the front laterally and longitudinally extending surfaces 140, 130. The front longitudinally extending surface 130 and the front laterally extending surface 140 define a front right leg area 104 discussed below with reference to FIG. 4B. The front outer surface 150 extends laterally outwardly and forwardly from the front laterally extending surface 140 to the laterally outer surface. As can be seen in FIG. 2B, in the illustrated implementation, the outer edge of the front portion of the footrest 64 is laterally aligned with the front outer surface 150.

With reference to FIGS. 2B, 2C, 3B and 3C, the laterally outer surface 101 of the right side panel 100 extends forwardly from the right end of the front outer surface 150 and then curves laterally inwardly. As can be seen in FIG. 2B, in the illustrated implementation, the laterally outer surface 101 extends laterally outwardly of the outer edge of the front portion of the footrest 64. It is however contemplated that the right side panel 100 could extend further or less laterally outwardly than as shown herein.

The left side panel (not shown) has a laterally outer surface defining a rear left leg area and a front left leg area. In the illustrated implementation, the left side panel (not shown) is a mirror image of the right side panel 100 and as such will not be described again in detail. The rear left leg area is a mirror image of the rear right leg area 102 and the front left leg area is a mirror image of the front right leg area 104. The left panel has a rear longitudinally extending surface that is a mirror image of the rear longitudinally extending surface 110 described above, a rear laterally extending surface that is a mirror image of the rear laterally extending surface 120 described above, a front longitudinally extending surface that is a mirror image of the front longitudinally extending surface 130 described above, a front laterally extending surface that is a mirror image of the front laterally extending surface 140 described above, and a front outer surface 150 that is a mirror image of the front outer surface 150 described above.

It is however contemplated that the outer surface of the left side panel 100 could define a rear left leg area 102 and a front left leg area 104 but not be a mirror image of the right side panel 100. For example, one or both of the rear left leg area and the front left leg area could be different from the corresponding rear right leg area 102 and the front right leg area 104. For example, the rear longitudinally extending surface 110 could be omitted from the left side panel, or the front laterally extending surface of the left panel could be different from the corresponding front laterally extending surface 140 of the right panel 100.

Figure 4A:
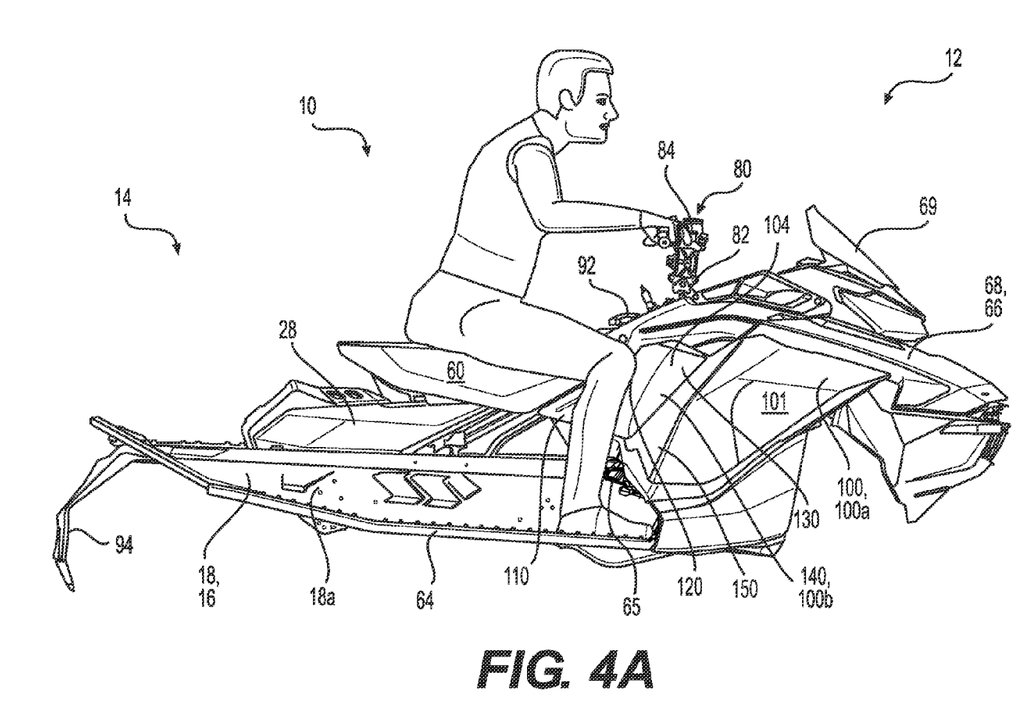
FIG. 4A is a right side elevation view of a portion of the snowmobile of FIG. 1 with a rider seated thereon in an upright riding position and the vehicle steered straight ahead.

With reference to FIG. 4A, when the driver is seated on the snowmobile in an upright position with the snowmobile 10 steered straight ahead as seen in FIG. 4A, the driver's right leg below the knee is intended to be disposed in the rear right leg area 102 with the inner surface of the right leg being disposed proximate the rear longitudinally extending surface 110 and the front surface of the right leg being disposed proximate the rear laterally extending surface 120. The lateral direction width of the rear laterally extending surface 120 is large enough to prevent the front surface of the driver's leg from sliding forward inadvertently. It is contemplated that the driver's leg could abut the right side panel 100 when the driver is in the upright position of FIG. 4A. It is contemplated that the rear longitudinally extending surface 110 could be omitted or formed by a portion of the snowmobile 10 other than the right side panel 100. For example, the inner surface of the driver's right leg could abut, or be disposed proximate the right side surface of the fuel tank 28 instead of the right side panel 100 when the driver is seated on the snowmobile 10 in an upright position as shown in FIG. 4A. Similarly, the driver's left leg below the knee is intended to be disposed in the rear left leg area (not shown) defined by the left panel (not shown) with the inner surface of the left leg being disposed adjacent the rear longitudinally extending surface (not shown) and the front surface of the left leg adjacent the rear laterally extending surface (not shown).

Figure 4B:
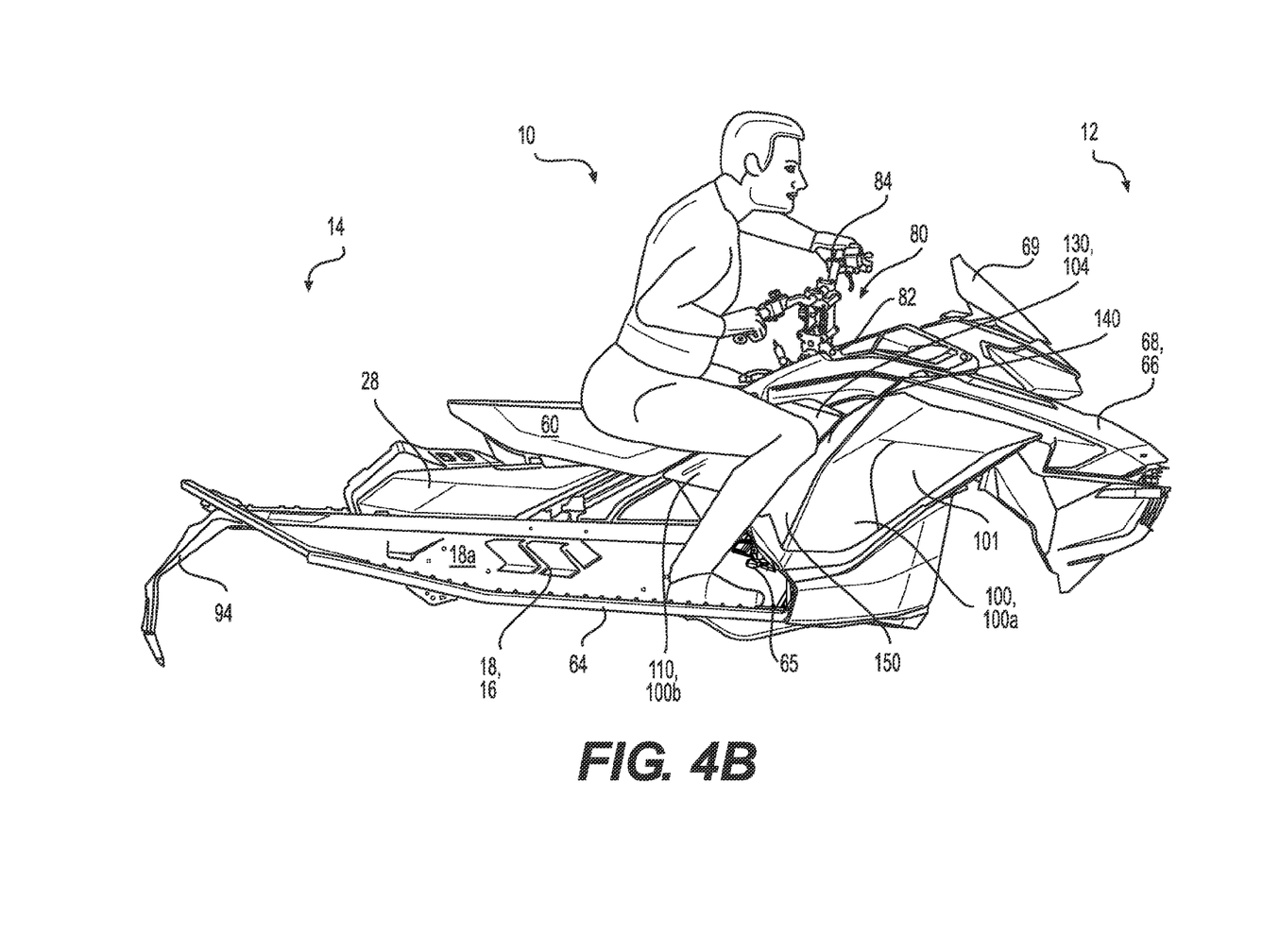
FIG. 4B is a right side elevation view of the snowmobile portion and rider of FIG. 4A with the rider seated thereon in a rightward leaning position with the vehicle turning towards the right.

With reference to FIG. 4B, when the driver is leaning while making a right turn with the snowmobile 10, the driver's knee and right leg below the knee is intended to be disposed in the front leg area 104 with the inner surface of the leg pressing against the front longitudinally extending surface 130 and the front surface of the leg pressing against the front laterally extending surface 140 for support. When the driver is in the leaning position shown in FIG. 4B, the driver's right knee is disposed longitudinally forward of the driver's right foot with the driver's right leg below the knee disposed at a smaller angle with the driver's foot than when in the upright position of FIG. 4A.

Figure 4C:
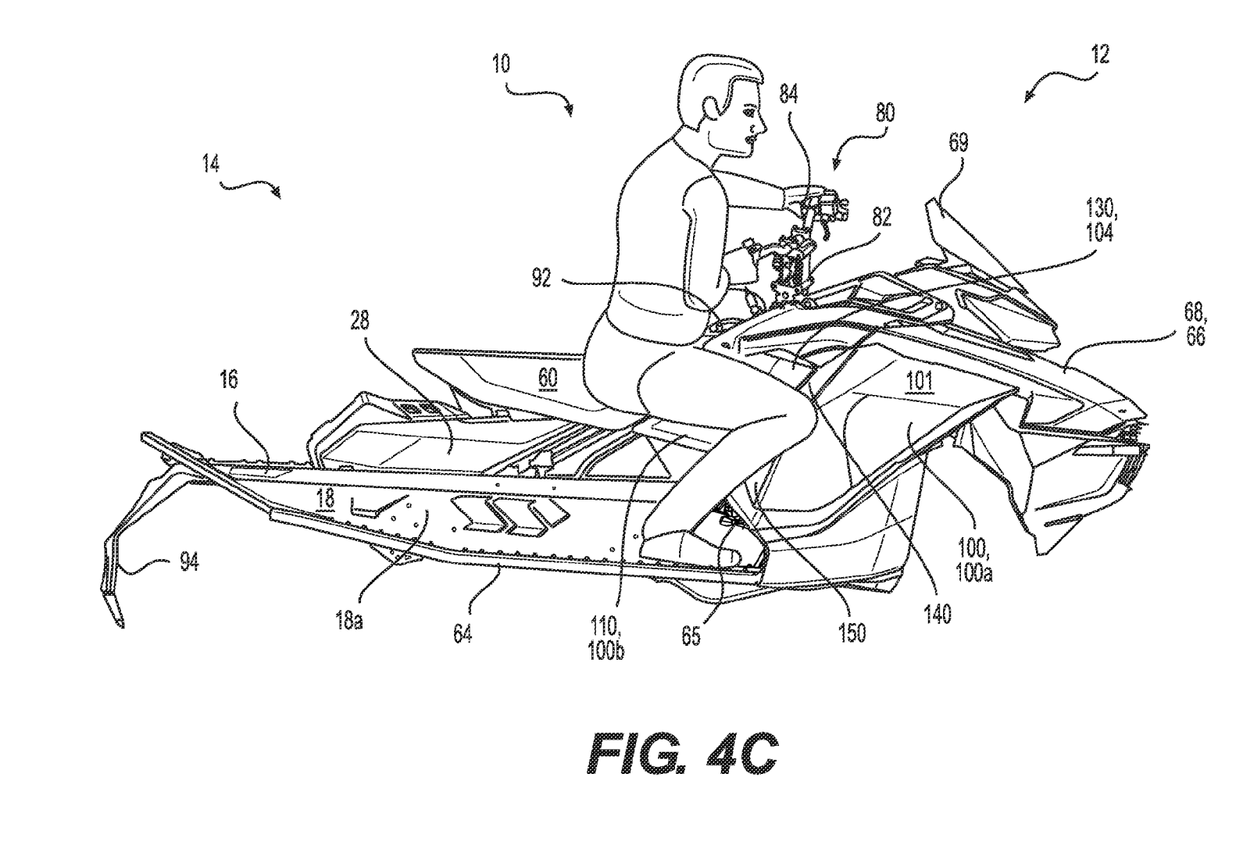
FIG. 4C is a right side elevation view of the snowmobile portion and rider of FIG. 4A with the rider seated thereon in a further rightward leaning position with the vehicle turning towards the right.

With reference to FIG. 4C, in a rightward leaning position when the driver is leaning further than in FIG. 4B while making a right turn with the snowmobile 10, the driver's knee and right leg below the knee is intended to be disposed with the inner surface of the leg pressing against the front longitudinally extending surface 130 and the front surface of the leg pressing against the front outer surface 150 for support. When the driver is in this rightward leaning position shown in FIG. 4C, the driver's right knee is disposed longitudinally forward of the driver's right foot with the driver's right leg below the knee disposed at a smaller angle with the driver's foot than when in the upright position of FIG. 4A or the leaning position of FIG. 4B.

As will be understood, when the driver is steering the snowmobile 10 towards the left, the driver's position on the snowmobile 10 will be a mirror image of that describe above with respect to FIGS. 4B and 4C.

The above describes the intended positioning of the driver's legs with respect to the side panels 100 and the snowmobile 10. It should however be understood that the driver of the snowmobile 10 may choose to position one or both legs differently than the intended positioning described above.

Modifications and improvements to the above-described implementations of the present may become apparent to those skilled in the art. The foregoing description is intended to be exemplary rather than limiting. The scope of the present is therefore intended to be limited solely by the scope of the appended claims.

What is claimed is:

1. A side panel for a vehicle having a straddle seat,
the side panel having an outer surface and being configured to be connected on a side of the vehicle at least in part longitudinally forward of the straddle seat and vertically lower than the straddle seat,
the outer surface comprising a first laterally extending surface and a second laterally extending surface disposed at least in part longitudinally forward of the first laterally extending surface when the side panel is connected on the vehicle, each of the first and second laterally extending surfaces extending generally laterally and vertically when the side panel is connected on the vehicle, and
the outer surface defining:
a first leg area configured to accommodate at least a portion of a leg of a driver seated on the straddle seat in a first position, the first leg area being defined at least in part by the first laterally extending surface; and a second leg area configured to accommodate at least a portion of the leg of the driver seated on the straddle seat in a second position, the second leg area being disposed at least in part longitudinally forward of the first leg area when the side panel is connected on the vehicle, the second leg area being defined at least in part by the second laterally extending surface.

2. The side panel of claim 1, wherein the second leg area is disposed at least in part laterally outwardly of the first leg area when the side panel is connected on the vehicle.

3. The side panel of claim 1, wherein the second laterally extending surface extends laterally outwardly of the first laterally extending surface.

4. The side panel of claim 1, wherein the outer surface further comprises a longitudinally extending surface extending generally longitudinally and vertically when the side panel is connected on the vehicle, the longitudinally extending surface being disposed at least in part longitudinally rearward of the second laterally extending surface and longitudinally forward of the first laterally extending surface when the side panel is connected on the vehicle.

5. The side panel of claim 4, wherein a longitudinal direction width of the longitudinally extending surface increases continuously from its lower end to its upper end.

6. The side panel of claim 4, wherein the outer surface extends continuously from the first laterally extending surface to the longitudinally extending surface.

7. The side panel of claim 4, wherein the outer surface further comprises a front outer surface extending laterally outwardly and forwardly from the second laterally extending surface when the side panel is connected on the vehicle.

8. The side panel of claim 7, wherein a portion of the front outer surface is disposed lower than the second laterally extending surface when the side panel is connected on the vehicle.

9. The side panel of claim 1, wherein the outer surface further comprises a longitudinally extending surface extending generally longitudinally and vertically when the side panel is connected on the vehicle, the longitudinally extending surface being disposed at least in part longitudinally rearward of the first laterally extending surface when the side panel is connected on the vehicle.

10. The side panel of claim 9, wherein the longitudinally extending surface is a first longitudinally extending surface and further comprising a second longitudinally extending surface extending generally longitudinally and vertically when the side panel is connected on the vehicle, the second longitudinally extending surface being disposed at least in part longitudinally rearward of the second laterally extending surface and longitudinally forward of the first laterally extending surface when the side panel is connected on the vehicle.

11. A vehicle comprising:
a frame;
a motor operatively connected to the frame;
a ground engaging member operatively connected to the motor and the frame, the ground engaging member being one of: an endless track, and a wheel;
a straddle seat connected to the frame and configured to accommodate at least a driver of the vehicle; and
a left side panel connected on a left side of the frame and a right side panel connected on a right side of the frame, each of the left and right side panels being disposed at least in part longitudinally forward of and vertically lower than the straddle seat, each of the left and right side panels having an outer surface comprising a rear laterally extending surface and a front laterally extending surface disposed at least in part longitudinally forward of the rear laterally extending surface, each of the rear and front laterally extending surfaces extending generally laterally and vertically,
the left side panel defining a rear left leg area and a front left leg area disposed longitudinally forward of the rear left leg area, the rear left leg area selectively accommodating a portion of a left leg of the driver in a first left leg position and the front left leg area selectively accommodating a portion of the left leg of the driver in a second left leg position, the rear left leg area being defined at least in part by the rear laterally extending surface of the left side panel and the front left leg area being defined at least in part by the front laterally extending surface of the left side panel,
the right side panel defining a rear right leg area and a front right leg area disposed longitudinally forward of the rear right leg area, the rear right leg area selectively accommodating a portion of a right leg of the driver in a first right leg position and the front right leg area selectively accommodating a portion of the right leg of the driver in a second right leg position, the rear right leg area being defined at least in part by the rear laterally extending surface of the right side panel and the front right leg area being defined at least in part by the front laterally extending surface of the right side panel.

* * * * *